(12) United States Patent
Iwata

(10) Patent No.: US 11,594,785 B2
(45) Date of Patent: Feb. 28, 2023

(54) NONAQUEOUS ELECTROLYTE SECONDARY BATTERY POROUS LAYER

(71) Applicant: Sumitomo Chemical Company, Limited, Tokyo (JP)

(72) Inventor: Shizuka Iwata, Osaka (JP)

(73) Assignee: SUMITOMO CHEMICAL COMPANY, LIMITED, Tokyo (JP)

( * ) Notice: Subject to any disclaimer, the term of this patent is extended or adjusted under 35 U.S.C. 154(b) by 292 days.

(21) Appl. No.: 16/848,894

(22) Filed: Apr. 15, 2020

(65) Prior Publication Data
US 2020/0335751 A1   Oct. 22, 2020

(30) Foreign Application Priority Data

Apr. 16, 2019 (JP) .............. JP2019-078116

(51) Int. Cl.
| | |
|---|---|
| *H01M 50/446* | (2021.01) |
| *H01M 50/417* | (2021.01) |
| *H01M 50/423* | (2021.01) |
| *H01M 50/451* | (2021.01) |
| *H01M 50/457* | (2021.01) |

(52) U.S. Cl.
CPC ....... *H01M 50/446* (2021.01); *H01M 50/417* (2021.01); *H01M 50/423* (2021.01); *H01M 50/451* (2021.01); *H01M 50/457* (2021.01)

(58) Field of Classification Search
CPC . H01M 50/446; H01M 50/449; H01M 50/411
See application file for complete search history.

(56) References Cited

U.S. PATENT DOCUMENTS

| | | | |
|---|---|---|---|
| 2006/0154140 A1 | 7/2006 | Yamamoto et al. | |
| 2012/0183862 A1 | 7/2012 | Gupta et al. | |
| 2013/0224560 A1* | 8/2013 | Yoshitomi | H01M 50/423 429/145 |
| 2017/0155112 A1 | 6/2017 | Ozeki | |
| 2017/0155118 A1 | 6/2017 | Hasegawa | |
| 2018/0038917 A1* | 2/2018 | Fukuda | H01M 4/587 |
| 2018/0277850 A1* | 9/2018 | Quero-Mieres | H01M 4/622 |
| 2019/0221880 A1 | 7/2019 | Hirai et al. | |
| 2022/0149483 A1* | 5/2022 | Sato | H01M 50/417 |

FOREIGN PATENT DOCUMENTS

| | | |
|---|---|---|
| CN | 1708865 A | 12/2005 |
| CN | 103180999 A | 6/2013 |
| CN | 106505174 A | 3/2017 |
| CN | 106972140 A | 7/2017 |
| CN | 109314203 A | 2/2019 |
| JP | 2000-260414 A | 9/2000 |

OTHER PUBLICATIONS

Office Action dated Dec. 30, 2022 in CN Application No. 202010299881.7.

* cited by examiner

*Primary Examiner* — Sarah A. Slifka
*Assistant Examiner* — Rachel L Zhang
(74) *Attorney, Agent, or Firm* — Panitch Schwarze Belisario & Nadel LLP

(57) ABSTRACT

The present invention provides a nonaqueous electrolyte secondary battery porous layer which improves an initial battery characteristic immediately after initial charge and discharge of a nonaqueous electrolyte secondary battery. In the nonaqueous electrolyte secondary battery porous layer in accordance with an aspect of the present invention, a standard deviation of bursting strength is 0.6 or more and 11.0 or less.

12 Claims, No Drawings

NONAQUEOUS ELECTROLYTE SECONDARY BATTERY POROUS LAYER

This Nonprovisional application claims priority under 35 U.S.C. § 119 on Patent Application No. 2019-078116 filed in Japan on Apr. 16, 2019, the entire contents of which are hereby incorporated by reference.

TECHNICAL FIELD

The present invention relates to a porous layer for a nonaqueous electrolyte secondary battery (hereinafter referred to as "nonaqueous electrolyte secondary battery porous layer").

BACKGROUND ART

Nonaqueous electrolyte secondary batteries, particularly lithium ion secondary batteries, have a high energy density and are therefore in wide use as batteries for personal computers, mobile phones, portable information terminals, and the like. Such nonaqueous electrolyte secondary batteries have recently been developed as on-vehicle batteries.

As a member of such a nonaqueous electrolyte secondary battery, a separator having excellent heat resistance is under development. As the separator which excels in heat resistance, a separator including a porous layer which contains a heat-resistant component is known.

Patent Literature 1 discloses a bursting strength of a nonwoven fabric for a separator in an alkaline battery.

CITATION LIST

Patent Literature

[Patent Literature 1]
Japanese Patent Application Publication Tokukai No. 2000-260414

SUMMARY OF INVENTION

Technical Problem

However, for example, the separator including the porous layer as disclosed in Patent Literature 1, i.e., a conventional separator including a porous layer which contains a heat-resistant component is still insufficient in initial battery characteristic.

Solution to Problem

The present invention has aspects described in [1] through [11] below.
[1] A nonaqueous electrolyte secondary battery porous layer, in which a standard deviation of bursting strength is 0.6 or more and 11.0 or less.
[2] The nonaqueous electrolyte secondary battery porous layer described in [1], containing one or more resins selected from the group consisting of polyolefin, a (meth)acrylate resin, a fluorine-containing resin, a nitrogen-containing aromatic resin, a polyester resin, and a water-soluble polymer.
[3] The nonaqueous electrolyte secondary battery porous layer described in [1], containing a nitrogen-containing aromatic resin.
[4] The nonaqueous electrolyte secondary battery porous layer described in [2] or [3], in which the nitrogen-containing aromatic resin includes a polyamide resin.
[5] The nonaqueous electrolyte secondary battery porous layer described in [4], in which the polyamide resin is an aramid resin.
[6] The nonaqueous electrolyte secondary battery porous layer described in [5], in which the aramid resin is one or more aramid resins selected from the group consisting of poly(paraphenylene terephthalamide), poly(metaphenylene terephthalamide), and a paraphenylene terephthalamide/metaphenylene terephthalamide copolymer.
[7] The nonaqueous electrolyte secondary battery porous layer described in any one of [1] through [6], containing a heat-resistant filler.
[8] The nonaqueous electrolyte secondary battery porous layer described in [7], in which the heat-resistant filler is an inorganic filler.
[9] The nonaqueous electrolyte secondary battery porous layer described in [8], in which the inorganic filler contains one or more inorganic substances selected from the group consisting of alumina, boehmite, aluminum hydroxide, magnesium hydroxide, magnesium oxide, titanium oxide, and silica.
[10] A nonaqueous electrolyte secondary battery laminated separator, in which a nonaqueous electrolyte secondary battery porous layer described in any one of [1] through [9] is stacked on one surface or both surfaces of a polyolefin porous film.
[11] A nonaqueous electrolyte secondary battery including: a nonaqueous electrolyte secondary battery porous layer described in any one of [1] through [9]; or a nonaqueous electrolyte secondary battery laminated separator described in [10].

Advantageous Effects of Invention

The nonaqueous electrolyte secondary battery porous layer in accordance with an embodiment of the present invention advantageously makes it possible to provide a nonaqueous electrolyte secondary battery having an excellent initial battery characteristic such as an AC resistance increase ratio at 10 Hz through initial charge and discharge.

DESCRIPTION OF EMBODIMENTS

The following description will discuss an embodiment of the present invention. Note, however, that the present invention is not limited to the embodiment. The present invention is not limited to arrangements described below, but may be altered in various ways by a skilled person within the scope of the claims. The present invention also encompasses, in its technical scope, any embodiment derived by appropriately combining technical means disclosed in differing embodiments. Note that a numerical range "A to B" herein means "A or more (higher) and B or less (lower)" unless otherwise stated.

Embodiment 1: Nonaqueous Electrolyte Secondary Battery Porous Layer (1. Nonaqueous Electrolyte Secondary Battery Porous Layer)

In a nonaqueous electrolyte secondary battery porous layer (hereinafter, sometimes simply referred to as "porous layer") in accordance with an embodiment of the present invention, a standard deviation of bursting strength is 0.6 or more and 11.0 or less.

The nonaqueous electrolyte secondary battery porous layer in accordance with an embodiment of the present invention can solely constitute a separator for a nonaqueous electrolyte secondary battery (hereinafter referred to as a "nonaqueous electrolyte secondary battery separator"). Alternatively, the nonaqueous electrolyte secondary battery porous layer in accordance with an embodiment of the present invention can be stacked on at least one surface of a polyolefin porous film (hereinafter sometimes simply referred to as "porous film") so as to constitute a laminated separator for a nonaqueous electrolyte secondary battery (hereinafter referred to as a "nonaqueous electrolyte secondary battery laminated separator" or simply as "laminated separator") which will be described later.

A "bursting strength" in accordance with an embodiment of the present invention is measured by a method called "Mullen method". The "bursting strength" is measured as follows: that is, a thin film is fixed to a surface of a rubber balloon, i.e., a swelling rubber surface (rubber diaphragm), and then the rubber balloon is swollen and a magnitude of stress which is applied when the thin film bursts is measured as the "bursting strength". In that case, the rubber balloon swells under the thin film which is a measurement target object, and thus stresses are applied to the thin film from all directions.

A "tensile strength" is generally used in measuring strength of a thin film and the "tensile strength" is a parameter for evaluating strength and elasticity with respect to a stress that is applied from a single direction. In contrast, the "bursting strength" is a parameter for evaluating strength and elasticity with respect to stresses applied from all directions.

From this, in an embodiment of the present invention, the "standard deviation of bursting strength" is a parameter for evaluating unevenness in strength and elasticity with respect to stresses applied from all directions, that is, a parameter for evaluating nonuniformity in strength and elasticity with respect to stresses applied from all directions.

In a nonaqueous electrolyte secondary battery, a gas is generated due to decomposition of a nonaqueous electrolyte or the like in initial charge and discharge. Moreover, in a nonaqueous electrolyte secondary battery which is immediately after assembly, that is, before and in initial charge and discharge, the nonaqueous electrolyte has not completely permeated through battery constituent members such as electrodes and a separator. Therefore, a portion through which the nonaqueous electrolyte has not permeated locally exists. From this, the gas is generated locally.

Under the circumstances, according to the nonaqueous electrolyte secondary battery, the electrode locally expands due to the gas locally generated through initial charge and discharge, and this leads to local expansion of the battery. In that case, a battery performance such as AC resistance may be deteriorated.

In the porous layer in accordance with an embodiment of the present invention, a standard deviation of bursting strength is 0.6 or more and 11.0 or less. The fact that the standard deviation falls within this range means that the porous layer includes, with a certain range of unevenness, (i) a portion which is more likely to stretch with respect to stresses applied from all directions and (ii) a portion which is less likely to stretch with respect to stresses applied from all directions.

The porous layer in accordance with an embodiment of the present invention includes, with moderate unevenness, therein the portion which is more likely to stretch and the portion which is less likely to stretch, and thus has moderate unevenness in elasticity. Therefore, the porous layer in accordance with an embodiment of the present invention can suitably follow the local expansion of the electrode caused due to the locally generated gas. As a result, it is possible to reduce the local expansion of the battery, and it is possible to improve a battery performance such as an AC resistance increase ratio through initial charge and discharge of the nonaqueous electrolyte secondary battery.

In contrast, in a case where the "standard deviation of bursting strength" in the porous layer is excessively large, the porous layer is to include, with excessive unevenness, the portion which is more likely to stretch and the portion which is less likely to stretch. As a result, uniformity in ion permeation through the porous layer and the nonaqueous electrolyte secondary battery laminated separator may be deteriorated, and therefore the battery performance such as AC resistance may be deteriorated.

In the porous layer in accordance with an embodiment of the present invention, the standard deviation of bursting strength is 0.6 or more and 11.0 or less, and the porous layer includes, with moderate unevenness, therein a portion which is more likely to stretch and a portion which is less likely to stretch. Therefore, the porous layer can suitably follow the foregoing local expansion of an electrode.

From the above point of view, the "standard deviation of bursting strength" in the porous layer in accordance with an embodiment of the present invention is preferably 0.7 or more, more preferably 1.0 or more. Moreover, the "standard deviation of bursting strength" in the porous layer in accordance with an embodiment of the present invention is preferably 10.0 or less, more preferably 8.0 or less, and further preferably 6.0 or less.

The "standard deviation of bursting strength" in the porous layer can be 0.7 or more and 10.0 or less, can be 1.0 or more and 8.0 or less, and can be 1.0 or more and 6.0 or less.

In view of improvement of the battery performance, the bursting strength of the porous layer in accordance with an embodiment of the present invention is preferably 3.0 kPa or more and 22.0 kPa or less, more preferably 5.0 kPa or more and 21.0 kPa or less, further preferably 8.0 kPa or more and 20.0 kPa or less.

According to an embodiment of the present invention, the "bursting strength" of the porous layer can be calculated by, for example, (i) measuring a bursting strength of the nonaqueous electrolyte secondary battery laminated separator in which the porous layer is stacked on one surface of a polyolefin porous film, (ii) measuring a bursting strength of only the polyolefin porous film which is obtained by eliminating the porous layer from the nonaqueous electrolyte secondary battery laminated separator, and then (iii) subtracting the bursting strength of only the polyolefin porous film from the bursting strength of the nonaqueous electrolyte secondary battery laminated separator.

Alternatively, the "bursting strength" of the porous layer can also be calculated by, for example, (a) measuring a bursting strength of only the polyolefin porous film, (b) measuring a bursting strength of the nonaqueous electrolyte secondary battery laminated separator in which the porous layer is stacked on one surface of the polyolefin porous film, and (c) subtracting the bursting strength of the polyolefin porous film from the bursting strength of the nonaqueous electrolyte secondary battery laminated separator.

The "bursting strength" is measured by using, for example, an automatic Mullen bursting strength tester such as IT-MBDA available from INTEC CO., LTD. In measuring a bursting strength of the nonaqueous electrolyte secondary battery laminated separator, the nonaqueous electrolyte secondary battery laminated separator is preferably set in the automatic Mullen bursting strength tester such that a surface of the porous layer in the nonaqueous electrolyte secondary battery laminated separator is arranged on a rubber diaphragm side.

The "standard deviation of bursting strength" in the porous layer in accordance with an embodiment of the present invention can be calculated, for example, as follows: that is, a plurality of measurement samples are cut out from a plurality of different portions arbitrarily selected in a single nonaqueous electrolyte secondary battery laminated separator; a bursting strength of the porous layer is measured for each of the obtained measurement samples with the above described method; and the standard deviation of bursting strength is calculated based on the measured values of bursting strength of the porous layer. Here, the number of pieces of the measurement samples which corresponds to the number of measurements for calculating the "standard deviation of bursting strength" is preferably three or more.

The porous layer in accordance with an embodiment of the present invention can be provided, as a member included in a nonaqueous electrolyte secondary battery, between (i) the polyolefin porous film and (ii) at least one of a positive electrode and a negative electrode. The porous layer can be formed on at least one surface of the polyolefin porous film. Alternatively, the porous layer can be formed on an active material layer of at least one of the positive electrode and the negative electrode. Further alternatively, the porous layer can be provided between the polyolefin porous film and at least one of the positive electrode and the negative electrode in such a manner as to be in contact with the polyolefin porous film and with the at least one of the positive electrode and the negative electrode. There can be a single porous layer or two or more porous layers provided between the polyolefin porous film and at least one of the positive electrode and the negative electrode.

The porous layer is preferably stacked on a surface of the porous film which surface faces the positive electrode. The porous layer is more preferably stacked so as to make contact with the positive electrode. The porous layer is preferably an insulating porous layer.

The porous layer in accordance with an embodiment of the present invention has a structure in which many pores, connected to one another, are provided, so that the porous layer is a layer through which a gas or a liquid can pass from one surface to the other. Further, in the laminated separator in accordance with an embodiment of the present invention, the porous layer can be a layer which serves as an outermost layer of the laminated separator and comes into contact with an electrode.

The porous layer in accordance with an embodiment of the present invention is typically a resin layer containing a resin. It is preferable that the resin is insoluble in the electrolyte of the battery and is electrochemically stable when the battery is in normal use.

Examples of the resin used in the porous layer in accordance with an embodiment of the present invention include polyolefins; (meth)acrylate resins; fluorine-containing resins; nitrogen-containing aromatic resins; polyester resins; rubbers; resins having a melting point or glass transition temperature of not lower than 180° C.; water-soluble polymers; polycarbonate, polyacetal, and polyether ether ketone.

Among the above resins, polyolefins, (meth)acrylate resins, fluorine-containing resins, nitrogen-containing aromatic resins, polyester resins and water-soluble polymers are preferable.

The polyolefins are preferably polyethylene, polypropylene, polybutene, an ethylene/propylene copolymer, and the like.

Examples of the fluorine-containing resins encompass polyvinylidene fluoride, polytetrafluoroethylene, a vinylidene fluoride/hexafluoropropylene copolymer, a tetrafluoroethylene/hexafluoropropylene copolymer, a tetrafluoroethylene/perfluoroalkyl vinyl ether copolymer, a vinylidene fluoride/tetrafluoroethylene copolymer, a vinylidene fluoride/trifluoroethylene copolymer, a vinylidene fluoride/trichloroethylene copolymer, a vinylidene fluoride/vinyl fluoride copolymer, a vinylidene fluoride/hexafluoropropylene/tetrafluoroethylene copolymer, and an ethylene/tetrafluoroethylene copolymer. Particular examples of the fluorine-containing resins encompass fluorine-containing rubber having a glass transition temperature of not higher than 23° C.

From the viewpoint of safety in a case of short circuit caused inside the battery, the nitrogen-containing aromatic resin is preferably one or more resins selected from the group consisting of an aramid resin, aromatic polyamide imide, and aromatic polyimide.

The aramid resin includes aromatic polyamide, wholly aromatic polyamide, and the like. The aromatic polyamide is preferably one or more resins selected from the group consisting of para(p)-aromatic polyamide and meth(m)-aromatic polyamide.

Specific examples of the aramid resins include poly (paraphenylene terephthalamide), poly(metaphenylene isophthalamide), poly(metaphenylene terephthalamide), poly(parabenzamide), poly(metabenzamide), poly(4,4'-benzanilide terephthalamide), poly(paraphenylene-4,4'-biphenylene dicarboxylic acid amide), poly(metaphenylene-4,4'-biphenylene dicarboxylic acid amide), poly(paraphenylene-2,6-naphthalene dicarboxylic acid amide), poly (metaphenylene-2,6-naphthalene dicarboxylic acid amide), poly(2-chloroparaphenylene terephthalamide), a paraphenylene terephthalamide/metaphenylene terephthalamide copolymer, a paraphenylene terephthalamide/2,6-dichloroparaphenylene terephthalamide copolymer, and a metaphenylene terephthalamide/2,6-dichloroparaphenylene terephthalamide copolymer. Among these, poly(paraphenylene terephthalamide), poly(metaphenylene terephthalamide), and the paraphenylene terephthalamide/metaphenylene terephthalamide copolymer are preferable.

The polyester resins are preferably aromatic polyesters such as polyarylates, and liquid crystal polyesters.

Examples of the rubbers include a styrene/butadiene copolymer and a hydride thereof, a methacrylate ester copolymer, an acrylonitrile/acrylic ester copolymer, a styrene/acrylic ester copolymer, ethylene propylene rubber, and polyvinyl acetate.

Examples of the resins each having a melting point or a glass transition temperature of not lower than 180° C. include polyphenylene ether, polysulfone, polyether sulfone, polyphenylene sulfide, polyetherimide, polyamide imide, and polyether amide.

Examples of the water-soluble polymers include polyvinyl alcohol, polyethylene glycol, cellulose ether, sodium alginate, polyacrylic acid, polyacrylamide, polymethacrylic acid, and sodium carboxymethylcellulose.

Each of these resins contained in the porous layer can be used solely. Alternatively, two or more of these resins contained in the porous layer can be used in combination.

The porous layer in accordance with an embodiment of the present invention can contain particles. In a case where the porous layer in accordance with an embodiment of the present invention contains particles, the resin is to have a function of a binder resin. The particles are organic particles or inorganic particles which are generally referred to as a filler. The particles are preferably a heat-resistant filler. The heat-resistant filler can be an inorganic filler or a heat-resistant organic filler, and preferably contains an inorganic filler. The heat-resistant filler means a filler having a melting point of not lower than 150° C.

Specific examples of organic substances constituting the organic particles contained in the porous layer in accordance with an embodiment of the present invention include (i) a homopolymer of a monomer such as styrene, vinyl ketone, acrylonitrile, methyl methacrylate, ethyl methacrylate, glycidyl methacrylate, glycidyl acrylate, or methyl acrylate, or (ii) a copolymer of two or more of such monomers; fluorine-containing resins such as polytetrafluoroethylene, an ethylene tetrafluoride/propylene hexafluoride copolymer, a tetrafluoroethylene/ethylene copolymer, and polyvinylidene fluoride; a melamine resin; a urea resin; polyethylene; polypropylene; polyacrylic acid and polymethacrylic acid; a resorcinol resin; and the like. The organic particles can contain a single kind of organic substance or contain two or more kinds of organic substances.

The resorcinol resin can be, specifically, resorcin (resorcinol), and a polymer obtained by polymerizing resorcin and an aldehyde monomer. The aldehyde monomer can be any aldehyde. Examples of the aldehyde monomer include formaldehyde, acetaldehyde, propionaldehyde, benzaldehyde, furfural, thiophene carboxaldehyde, and the like. The aldehyde monomer is preferably formaldehyde. A formaldehyde monomer can be prepared from trioxane (which is a trimer of formaldehyde) or paraformaldehyde (which is a multimer of formaldehyde) in polymerization reaction of resorcin and the formaldehyde monomer. A single kind of aldehyde monomer or a mixture of two or more kinds of aldehyde monomers can be used.

Specific examples of the inorganic particles contained in the porous layer in accordance with an embodiment of the present invention include inorganic fillers each made of an inorganic substance such as calcium carbonate, talc, clay, kaolin, silica, hydrotalcite, diatomaceous earth, magnesium carbonate, barium carbonate, calcium sulfate, magnesium sulfate, barium sulfate, aluminum hydroxide, boehmite, magnesium hydroxide, calcium oxide, magnesium oxide, titanium oxide, titanium nitride, alumina (aluminum oxide), aluminum nitride, mica, zeolite, or glass. The inorganic filler can be (i) only one kind of filler or (ii) two or more kinds of fillers in combination.

From the viewpoint of battery characteristic, the inorganic filler is preferably an inorganic filler made of a metal oxide or an inorganic filler made of a metal hydroxide. The inorganic filler made of a metal oxide can be, for example, an inorganic filler made of an aluminum oxide and/or a magnesium oxide. The inorganic filler made of a metal hydroxide can be, for example, an inorganic filler made of an aluminum hydroxide and/or a magnesium hydroxide.

An average particle diameter (D50) of the filler is preferably 0.001 μm or more and 10 μm or less, more preferably 0.01 μm or more and 8 μm or less, further preferably 0.05 μm or more and 5.0 μm or less. The average particle diameter of the filler is a value measured with use of MICROTRAC (MODEL: MT-3300EXII) available from NIKKISO CO., LTD.

A shape of the filler varies depending on a method for producing a raw material, i.e., an organic substance or an inorganic substance, a dispersion condition of the filler in preparing a coating liquid for forming the porous layer, and the like. Accordingly, the shape of the filler can be any of various shapes including (i) a shape such as a spherical shape, an oval shape, a rectangular shape, a gourd-like shape and (ii) an indefinite shape having no specific shape.

In a case where the porous layer contains a filler and an amount of the porous layer containing the filler is assumed as 100% by volume, a contained amount of the filler is preferably 40% by volume to 99% by volume, more preferably 45% by volume to 95% by volume. In a case where the contained amount of the filler falls within the above range, it is less likely that a void, which is formed when the fillers come into contact with each other, is blocked by the resin or the like, and this makes it possible to obtain sufficient ion permeability. Furthermore, the contained amount falling within the above range also makes it possible to set a weight per unit area to an appropriate value.

The porous layer can contain two or more kinds of particles in combination which two or more kinds differ from each other in particle diameter or in specific surface area.

The porous layer in accordance with an embodiment of the present invention preferably contains a heat-resistant filler. Here, "heat resistance" means that a melting point is not lower than 150° C. The heat-resistant filler can be one kind of heat-resistant filler or can be a combination of two or more kinds of heat-resistant fillers. The heat-resistant filler is preferably the above described inorganic filler, a heat-resistant organic filler, or a mixture thereof. The heat-resistant filler preferably contains the above described inorganic filler.

The heat-resistant organic filler is preferably a thermosetting resin filler, a heat-resistant thermoplastic resin filler, or a mixture thereof.

A resin constituting the heat-resistant organic filler is preferably the above described aramid resin or the above described resorcinol resin. The aramid resin is preferably poly(paraphenylene terephthalamide), poly(metaphenylene terephthalamide), or the paraphenylene terephthalamide/metaphenylene terephthalamide copolymer.

The porous layer in accordance with an embodiment of the present invention can contain the other component different from the resin and the particles. Examples of that other component include a surfactant, a wax, and the like. A content of that other component is preferably 0% by weight to 10% by weight with respect to the total weight of the porous layer.

A thickness of the porous layer in accordance with an embodiment of the present invention is preferably 5 μm or less per layer, more preferably 4 μm or less per layer, from the viewpoint of preventing a deterioration in battery characteristic. The thickness of the porous layer is preferably 0.5 μm or more per layer, more preferably 1 μm or more per layer, from the viewpoint of sufficiently preventing internal short circuit caused due to breakage of the battery or the like and of preventing a decrease in retained amount of the electrolyte.

In view of ion permeability, the porous layer in accordance with an embodiment of the present invention preferably has a sufficiently porous structure. Specifically, the porous layer preferably has a porosity of 30% to 60%.

The porosity can be calculated by, for example, the following formula (1), where (i) W is a weight (g) of a porous layer having a certain volume (8 cm×8 cm×d (cm) (d: thickness)), (ii) d is the thickness (μm) of the porous layer, and (iii) p is an absolute specific gravity (g/cm$^3$) of the porous layer:

$$\text{Porosity (\%)} = (1 - \{(W/\rho)/(8 \times 8 \times d)\}) \times 100 \qquad (1)$$

The porous layer in accordance with an embodiment of the present invention preferably has an average pore diameter which falls within a range from 20 nm to 100 nm, from the viewpoint of ion permeability and of preventing particles from intruding into the positive electrode and the negative electrode.

The average pore diameter can be calculated by, for example, (i) observing the porous layer in accordance with an embodiment of the present invention from an upper surface with use of a scanning electron microscope (SEM), (ii) measuring respective pore diameters of a plurality of holes randomly selected, and (iii) obtaining an average value of the pore diameters thus measured.

A weight per unit area of the porous layer in accordance with an embodiment of the present invention is preferably 0.5 $g/m^2$ to 10 $g/m^2$, more preferably 0.5 $g/m^2$ to 5 $g/m^2$ per layer of the porous layer in view of strength, thickness, weight, and handleability of the porous layer.

(2. Method for Producing Porous Layer)

A method for producing the porous layer in accordance with an embodiment of the present invention can be, for example, a method which includes any one of processes (1) through (3) below and in which a porous layer is formed on a base material. A coating liquid in the processes (1) through (3) below typically contains the above described resin and, if needed, can contain the above described particles, as components constituting the porous layer in accordance with an embodiment of the present invention. In the cases of the processes (2) and (3) below, the resin deposited is further dried for removal of the solvent, and thus a porous layer can be produced. In the coating liquid used in the processes (1) through (3), the particles can be dispersed and the resin can be dissolved. The base material is not particularly limited and encompasses, for example, a positive electrode, a negative electrode, and a porous film which serves as a base material of the laminated separator in accordance with an embodiment of the present invention. The solvent can be regarded as a solvent in which the resin is dissolved and as a dispersion medium in which the resin or the particles are dispersed.

(1) A process in which (i) a base material is coated with a coating liquid, and then (ii) the base material is dried for removal of a solvent from the coating liquid, so that a porous layer is formed.

(2) A process of (i) coating a surface of the base material with the coating liquid containing the resin and then (ii) immersing the base material into a deposition solvent (which is a poor solvent for the resin) for deposition of the resin to form a porous layer.

(3) A process of (i) coating a surface of the base material with the coating liquid containing the resin and then (ii) making the coating liquid acidic with use of a low-boiling-point organic acid for deposition of the resin to form a porous layer.

The solvent for the coating liquid is preferably a solvent that does not adversely affect the base material, that allows the resin to be dissolved or dispersed therein uniformly and stably, and that allows the particles to be dispersed therein uniformly and stably. Examples of the solvent include N-methylpyrrolidone, N,N-dimethylacetamide, N,N-dimethylformamide, acetone, alcohols, water, and a mixed solvent containing two or more of these.

The deposition solvent is preferably isopropyl alcohol or t-butyl alcohol, for example.

For the process (3), the low-boiling-point organic acid can be, for example, paratoluene sulfonic acid or acetic acid.

In a case where a preferable production method is employed in the method for producing the porous layer in accordance with an embodiment of the present invention, it is possible to suitably control unevenness in strength and elasticity with respect to stresses applied from all directions to the porous layer, and it is consequently possible to adjust the standard deviation of bursting strength of the porous layer in accordance with an embodiment of the present invention to the suitable range.

The above preferable production method can be a method in which the coating liquid is left still before coating so that the coating liquid has a dispersion state which is moderately nonuniform. A period of time for which the coating liquid is left still before coating is preferably 10 minutes to 2 hours, more preferably 45 minutes to 1 hour and 15 minutes. In a case where the coating liquid before coating has a dispersion state which is moderately nonuniform, it is possible to form a porous layer in which uniformities of the resin and particles are moderately disturbed. That is, a moderate bias of the resin and particles is generated in the porous layer, and thus the porous layer is to include, with moderate unevenness, a portion which is more likely to stretch and a portion which is less likely to stretch. Such a porous layer has moderate unevenness in elasticity, and can suitably follow the local expansion of the electrode caused due to the gas which is locally generated in charge and discharge. As a result, it is possible to reduce the local expansion of the battery, and it is possible to improve a battery performance such as an AC resistance increase ratio through initial charge and discharge of the nonaqueous electrolyte secondary battery.

Embodiment 2: Nonaqueous Electrolyte Secondary Battery Laminated Separator

The nonaqueous electrolyte secondary battery laminated separator in accordance with an embodiment of the present invention has a configuration in which the porous layer is stacked on at least one surface of a polyolefin porous film.

In a case of a laminated separator in which porous layers are stacked on both surfaces of a polyolefin porous film, the porous layer in accordance with an embodiment of the present invention only needs to be at least of the porous layers, and it is preferable that the porous layer in accordance with an embodiment of the present invention is stacked on one surface of the polyolefin porous film, and another porous layer is stacked on the other surface of the polyolefin porous film.

(1. Polyolefin Porous Film)

The polyolefin porous film in accordance with an embodiment of the present invention includes polyolefin as a main component. The polyolefin porous film has therein many pores, connected to one another, so that a gas and a liquid can pass through the polyolefin porous film from one side to the other side. The porous film serves as a base material on which the porous layer is stacked in the laminated separator in accordance with an embodiment of the present invention.

The laminated separator in accordance with an embodiment of the present invention can include, in addition to the porous film and the porous layer, other layer(s) such as an adhesive layer, a heat-resistant layer, and/or a protective layer.

The porous film contains a polyolefin at a proportion of not less than 50% by volume, preferably not less than 90% by volume, more preferably not less than 95% by volume, relative to the entire porous film. The polyolefin more preferably contains a high molecular weight component having a weight-average molecular weight of $5\times10^5$ to $15\times10^6$. In particular, the polyolefin more preferably contains a high molecular weight component having a weight-average molecular weight of not less than 1,000,000 because such a polyolefin allows the nonaqueous electrolyte secondary battery separator to have higher strength.

Specific examples of the polyolefin (thermoplastic resin) include a homopolymer or a copolymer each produced by polymerizing a monomer such as ethylene, propylene, 1-butene, 4-methyl-1-pentene, or 1-hexene. Examples of the homopolymer include polyethylene, polypropylene, and polybutene. Examples of the copolymer include an ethylene/propylene copolymer.

Among the above examples, polyethylene is more preferable as it is capable of preventing a flow of an excessively large electric current at a lower temperature. The prevention of an excessively large electric current is also referred to as shutdown. Examples of the polyethylene include low-density polyethylene, high-density polyethylene, linear polyethylene (ethylene/α-olefin copolymer), and ultra-high molecular weight polyethylene having a weight-average molecular weight of not less than 1,000,000. Among these examples, ultra-high molecular weight polyethylene having a weight-average molecular weight of not less than 1,000,000 is further preferable.

The porous film has a film thickness of preferably 4 μm to 40 μm, more preferably 5 μm to 30 μm, still more preferably 6 μm to 15 μm.

The porous film can have a weight per unit area which weight is appropriately determined in view of the strength, film thickness, weight, and handleability. The weight per unit area is, however, within a range of preferably 4 g/m² to 15 g/m², more preferably 4 g/m² to 12 g/m², even more preferably 5 g/m² to 10 g/m², so as to allow a nonaqueous electrolyte secondary battery to have a higher weight energy density and a higher volume energy density.

The porous film has an air permeability of preferably 30 sec/100 mL to 500 sec/100 mL, more preferably 50 sec/100 mL to 300 sec/100 mL, in terms of Gurley values. A porous film having an air permeability within the above range can have sufficient ion permeability. A laminated separator in which the porous layer described above is provided on a porous film has an air permeability of preferably 30 sec/100 mL to 1000 sec/100 mL, more preferably 50 sec/100 mL to 800 sec/100 mL in terms of Gurley values. The laminated separator, which has the above air permeability, allows the nonaqueous electrolyte secondary battery to have sufficient ion permeability.

The porous film has a porosity of preferably 20% by volume to 80% by volume, more preferably 30% by volume to 75% by volume, so as to (i) retain a larger amount of electrolyte and (ii) obtain the function of reliably preventing a flow of an excessively large electric current at a lower temperature. Further, in order to obtain sufficient ion permeability and prevent particles from entering the positive electrode and/or the negative electrode, the porous film has pores each having a pore diameter of preferably not larger than 0.30 μm, more preferably not larger than 0.14 μm, even more preferably not larger than 0.10 μm.

(2. Method for Producing Polyolefin Porous Film)

The method for producing the polyolefin porous film is not limited to any particular one. For example, the method can include the following steps:

(A) Obtaining a polyolefin resin composition by kneading ultra-high molecular weight polyethylene, low molecular weight polyethylene having a weight-average molecular weight of not more than 10,000, a pore forming agent (such as calcium carbonate or plasticizer), and an antioxidant;

(B) Forming a sheet by rolling the obtained polyolefin resin composition with use of a pair of rollers, and gradually cooling the polyolefin resin composition while pulling the polyolefin resin composition with use of a winding roller rotating at a rate different from that of the pair of rollers;

(C) Removing the pore forming agent from the obtained sheet with use of an appropriate solvent; and (D) Stretching, at an appropriate stretch magnification, the sheet from which the pore forming agent has been removed.

(3. Method for Producing Nonaqueous Electrolyte Secondary Battery Laminated Separator)

A method for producing the nonaqueous electrolyte secondary battery laminated separator in accordance with an embodiment of the present invention can be, for example, the above-described method for producing the porous layer in which the above-described polyolefin porous film is used as a base material which is coated with the coating liquid.

Embodiment 3: Nonaqueous Electrolyte Secondary Battery

A nonaqueous electrolyte secondary battery in accordance with an embodiment of the present invention includes (i) a nonaqueous electrolyte secondary battery porous layer in accordance with an embodiment of the present invention or (ii) a nonaqueous electrolyte secondary battery laminated separator in accordance with an embodiment of the present invention.

The nonaqueous electrolyte secondary battery in accordance with an embodiment of the present invention can be, for example, a nonaqueous secondary battery that achieves an electromotive force through doping with and dedoping of lithium, and can be a lithium-ion secondary battery that includes a member for a nonaqueous electrolyte secondary battery (hereinafter referred to as a "nonaqueous electrolyte secondary battery member") including a positive electrode, a porous layer in accordance with an embodiment of the present invention, a polyolefin porous film, and a negative electrode, which are stacked in this order, that is, a nonaqueous electrolyte secondary battery member including a positive electrode, a nonaqueous electrolyte secondary battery laminated separator in accordance with an embodiment of the present invention, and a negative electrode, which are stacked in this order. Note that constituent elements of the nonaqueous electrolyte secondary battery other than the porous layer are not limited to those described below.

The nonaqueous electrolyte secondary battery in accordance with an embodiment of the present invention is typically configured so that a battery element is enclosed in an exterior member, the battery element including (i) a structure in which the negative electrode and the positive electrode face each other through the nonaqueous electrolyte secondary battery porous layer in accordance with an embodiment of the present invention or the nonaqueous electrolyte secondary battery laminated separator in accordance with an embodiment of the present invention and (ii) an electrolyte with which the structure is impregnated. The nonaqueous electrolyte secondary battery in accordance with an embodiment of the present invention is preferably a secondary battery including a nonaqueous electrolyte, and is particularly preferably a lithium-ion secondary battery.

The nonaqueous electrolyte secondary battery in accordance with an embodiment of the present invention includes the nonaqueous electrolyte secondary battery porous layer in accordance with an embodiment of the present invention in which the standard deviation of bursting strength is 0.6 or more and 11.0 or less, and therefore brings about an effect of having an excellent initial battery characteristic.

(1. Positive Electrode)

Examples of a positive electrode included in the nonaqueous electrolyte secondary battery in accordance with an embodiment of the present invention encompass a positive electrode sheet having a structure in which an active material layer including a positive electrode active material and a binding agent is formed on a current collector. The active material layer can further contain an electrically conductive agent.

The positive electrode active material is, for example, a material capable of being doped with and dedoped of lithium ions. Examples of such a material encompass a lithium complex oxide containing at least one transition metal such as V, Mn, Fe, Co, or Ni.

Examples of the electrically conductive agent encompass carbonaceous materials such as natural graphite, artificial graphite, cokes, carbon black, pyrolytic carbons, carbon fiber, and a fired product of an organic polymer compound. It is possible to use (i) only one kind of the above electrically conductive agents or (ii) two or more kinds of the above electrically conductive agents in combination, for example, a mixture of artificial graphite and carbon black.

Examples of the binding agent encompass: thermoplastic resins such as polyvinylidene fluoride, a copolymer of vinylidene fluoride, polytetrafluoroethylene, a vinylidene fluoride/hexafluoropropylene copolymer, a tetrafluoroethylene/hexafluoropropylene copolymer, a tetrafluoroethylene/perfluoroalkyl vinyl ether copolymer, an ethylene/tetrafluoroethylene copolymer, a vinylidene fluoride/tetrafluoroethylene copolymer, a vinylidene fluoride/trifluoroethylene copolymer, a vinylidene fluoride/trichloroethylene copolymer, a vinylidene fluoride/vinyl fluoride copolymer, a vinylidene fluoride/hexafluoropropylene/tetrafluoroethylene copolymer, a thermoplastic polyimide, polyethylene, and polypropylene; acrylic resin; and styrene butadiene rubber. Note that the binding agent also serves as a thickener.

The positive electrode mix can be prepared by, for example, a method of applying pressure to the positive electrode active material, the electrically conductive agent, and the binding agent on the positive electrode current collector or a method of using an appropriate organic solvent so that the positive electrode active material, the electrically conductive agent, and the binding agent are made into a paste form.

Examples of the positive electrode current collector encompass electric conductors such as Al, Ni, and stainless steel. Among these, Al is preferable because Al is easily processed into a thin film and is inexpensive.

The positive electrode sheet can be produced, that is, the positive electrode mix can be supported by the positive electrode current collector by, for example, a method in which pressure is applied to the positive electrode active material, the electrically conductive agent, and the binding agent on the positive electrode current collector to form a positive electrode mix thereon.

(2. Negative Electrode)

Examples of a negative electrode included in the nonaqueous electrolyte secondary battery in accordance with an embodiment of the present invention encompass a negative electrode sheet having a structure in which an active material layer including a negative electrode active material and a binding agent is formed on a current collector. The active material layer can further contain an electrically conductive agent.

Examples of the negative electrode active material encompass (i) a material capable of being doped with and dedoped of lithium ions, (ii) a lithium metal, and (iii) a lithium alloy. Specific examples of the material encompass: (1) carbonaceous materials such as natural graphite, artificial graphite, cokes, carbon black, pyrolytic carbons, carbon fiber, and a fired product of an organic polymer compound; (2) chalcogen compounds such as an oxide and a sulfide that are doped with and dedoped of lithium ions at an electric potential lower than that for the positive electrode; (3) metals such as aluminum (Al), lead (Pb), tin (Sn), bismuth (Bi), or silicon (Si), each of which is alloyed with alkali metal; (4) an intermetallic compound (AlSb, $Mg_2Si$, $NiSi_2$) of a cubic system in which intermetallic compound alkali metal can be inserted in voids in a lattice; and (5) lithium nitrogen compounds ($Li_{3-x}M_xN$ (where M represents a transition metal)).

The negative electrode mix can be prepared by, for example, a method in which pressure is applied to the negative electrode active material on a negative electrode current collector or a method in which an appropriate organic solvent is used so that the negative electrode active material is made into a paste form.

Examples of the negative electrode current collector encompass electric conductors such as Cu, Ni, and stainless steel.

The negative electrode sheet can be produced, that is, the negative electrode mix can be supported by the negative electrode current collector by, for example, a method in which pressure is applied to the negative electrode active material on the negative electrode current collector to form a negative electrode mix thereon. The above paste preferably includes the above electrically conductive agent and the above binding agent.

(3. Nonaqueous Electrolyte)

A nonaqueous electrolyte for use in the nonaqueous electrolyte secondary battery in accordance with an embodiment of the present invention is a nonaqueous electrolyte generally used in a nonaqueous electrolyte secondary battery, and is not limited to any particular one. Examples of the nonaqueous electrolyte encompass a nonaqueous electrolyte prepared by dissolving a lithium salt in an organic solvent. Examples of the lithium salt encompass $LiClO_4$, $LiPF_6$, $LiAsF_6$, $LiSbF_6$, $LiBF_4$, $LiCF_3SO_3$, $LiN(CF_3SO_2)_2$, $LiC(CF_3SO_2)_3$, $Li_2B_{10}Cl_{10}$, lower aliphatic carboxylic acid lithium salt, and $LiAlCl_4$. It is possible to use only one kind of the above lithium salts or two or more kinds of the above lithium salts in combination.

Specific examples of the organic solvent in the nonaqueous electrolyte in accordance with an embodiment of the present invention include carbonates such as ethylene carbonate, propylene carbonate, dimethyl carbonate, diethyl carbonate, ethyl methyl carbonate, 4-trifluoromethyl-1,3-dioxolane-2-on, and 1,2-di(methoxy carbonyloxy)ethane; ethers such as 1,2-dimethoxyethane, 1,3-dimethoxypropane, pentafluoropropyl methylether, 2,2,3,3-tetrafluoropropyl difluoro methylether, tetrahydrofuran, and 2-methyl tetrahydrofuran; esters such as methyl formate, methyl acetate, and γ-butyrolactone; nitriles such as acetonitrile and butyronitrile; amides such as N,N-dimethylformamide and N,N-dimethylacetamide; carbamates such as 3-methyl-2-oxazolidone; sulfur-containing compounds such as sulfolane, dimethyl sulfoxide, and 1,3-propane sultone; and fluorine-containing organic solvents each prepared by introducing a fluorine group into the organic solvents described above. It is possible to use only one kind of the above organic solvents or two or more kinds of the above organic solvents in combination.

(4. Method for Producing Nonaqueous Electrolyte Secondary Battery)

A nonaqueous electrolyte secondary battery in accordance with an embodiment of the present invention can be produced by, for example, (i) producing a nonaqueous electrolyte secondary battery member by providing the positive electrode, the nonaqueous electrolyte secondary battery laminated separator in accordance with an embodiment of the present invention, and a negative electrode in this order, then (ii) inserting the nonaqueous electrolyte secondary battery member into a container that will serve as a housing of a nonaqueous electrolyte secondary battery, then (iii) filling the container with a nonaqueous electrolyte, and then (iv) hermetically sealing the container while reducing pressure inside the container.

The nonaqueous electrolyte secondary battery is not particularly limited in shape and can have any shape such as the shape of a thin plate (sheet), a disk, a cylinder, or a prism such as a cuboid. The nonaqueous electrolyte secondary battery member and the nonaqueous electrolyte secondary battery can each be produced by any method, and can each be produced by a conventionally publicly known method.

The present invention is not limited to the embodiments, but can be altered variously by a skilled person in the art within the scope of the claims. The present invention also encompasses, in its technical scope, any embodiment derived by appropriately combining technical means disclosed in differing embodiments. Further, it is possible to form a new technical feature by combining the technical means disclosed in the respective embodiments.

EXAMPLES

The following description will discuss the present invention in further detail with reference to Examples and Comparative Examples. Note, however, that the present invention is not limited to those Examples.

In each of Examples and Comparative Examples, physical properties and the like of a nonaqueous electrolyte secondary battery laminated separator, a layer A (polyolefin porous film), a layer B (porous layer), and a nonaqueous electrolyte secondary battery were measured by the following methods.

(1) Film thickness (unit: μm):

A thickness of the nonaqueous electrolyte secondary battery laminated separator (i.e., a total film thickness), a thickness of the layer A, and a thickness of the layer B were each measured with use of a high-precision digital length measuring machine available from Mitutoyo Corporation.

(2) Weight per unit area (unit: g/m$^2$):

A sample in the form of a 6.4 cm×4 cm rectangle was cut out from the nonaqueous electrolyte secondary battery laminated separator, and the weight W (g) of the sample was measured. Then, the weight per unit area of the nonaqueous electrolyte secondary battery laminated separator film was calculated in accordance with the following formula:

Weight per unit area (g/m$^2$)=W/(0.064×0.04)

The weight per unit area of the layer A was calculated in a similar manner. The weight per unit area of the layer B was calculated by subtracting the weight per unit area of the layer A from the weight per unit area of the nonaqueous electrolyte secondary battery laminated separator.

(3) Average particle diameter (D50), particle size distribution (unit: μm):

The average particle diameter and the particle size distribution of the filler were measured with use of MICROTRAC (MODEL: MT-3300EXII) available from NIKKISO CO., LTD.

(4) Standard Deviation of Mullen Bursting Strength

With use of a commercially available automatic Mullen bursting strength tester (available from INTEC CO., LTD., IT-MBDA), bursting strengths of nonaqueous electrolyte secondary battery laminated separators produced in Examples 1 through 4 and Comparative Examples 1 and 2 and a bursting strength of a porous film (layer A) itself included in each of the nonaqueous electrolyte secondary battery laminated separators were measured under conditions indicated below. The nonaqueous electrolyte secondary battery laminated separator was set in the automatic Mullen bursting strength tester such that a surface of a porous layer (layer B) comes on a rubber diaphragm side, and bursting strengths of the nonaqueous electrolyte secondary battery laminated separator and the layer A were measured in that setting.

Test method: In conformity to the method of JIS L 1096 8.1 A

Test environment: Room temperature at 20±2° C., indoor humidity at 60±5% RH

Number of measurements: n=5

With use of measured values of the bursting strengths of the nonaqueous electrolyte secondary battery laminated separator and the layer A, a bursting strength of the layer B was calculated based on a formula (2) below.

Bursting strength (kPa) of layer B=bursting strength (kPa) of nonaqueous electrolyte secondary battery laminated separator−bursting strength (kPa) of layer A only  (2)

The calculation of standard deviation of bursting strength was specifically carried out by the process described below.

From the nonaqueous electrolyte secondary battery laminated separator, a measurement sample having a size of 15 cm×15 cm was cut out. With the foregoing method, a bursting strength of the nonaqueous electrolyte secondary battery laminated separator was measured. Similarly, a bursting strength of only the porous film (layer A) was measured. After that, based on the formula (2) above, a bursting strength of a porous layer in the measurement sample was calculated as a bursting strength of the porous layer (layer B).

Three measurement samples were cut out from respective three different portions arbitrarily selected in a single nonaqueous electrolyte secondary battery laminated separator, and a bursting strength of the porous layer (layer B) was calculated for each of the three measurement samples with the foregoing method. Based on the calculated values of bursting strength of the porous layer (layer B), a standard deviation of bursting strength of the porous layer (layer B) was calculated.

(5) Measurement of AC Resistance

A voltage having an amplitude of 10 mV was applied to the prepared nonaqueous electrolyte secondary battery at a room temperature of 25° C. with use of an LCR meter (product name: Chemical Impedance Meter, Model: 3532-80) available from HIOKI E.E. CORPORATION, and thus a Nyquist plot of the nonaqueous electrolyte secondary battery was prepared. A size of an X intercept in the Nyquist plot was read as a resistance $R_{10Hz}$ of a real part at a measuring frequency of 10 Hz. The resistance $R_{10Hz}$ is herein defined as a resistance of the prepared laminated cell battery. Here, "$R_{10Hz}$" indicates a resistance of the entire battery. The value $R_{10Hz}$ thus measured is defined as "AC resistance at 10 Hz".

Example 1

A nonaqueous electrolyte secondary battery laminated separator 1 was prepared with use of a layer A and a layer B below.

<Layer A>

A porous film serving as a base material was prepared with use of polyethylene which is polyolefin.

That is, 70 parts by weight of an ultra-high molecular weight polyethylene powder (340M, available from Mitsui Chemicals, Inc.) and 30 parts by weight of a polyethylene wax (FNP-0115, available from Nippon Seiro Co., Ltd.) having a weight-average molecular weight of 1,000 were mixed with each other so that a mixed polyethylene was prepared. Then, with respect to 100 parts by weight of the mixed polyethylene thus obtained, 0.4 parts by weight of an antioxidant (Irg1010, available from Ciba Specialty Chemicals Inc.), 0.1 parts by weight of an antioxidant (P168, available from Ciba Specialty Chemicals Inc.), and 1.3 parts by weight of sodium stearate were added. Then, calcium carbonate (available from Maruo Calcium Co., Ltd.) having an average particle diameter of 0.1 μm was further added so that the calcium carbonate accounted for 38% by volume of the total volume. Then, the above composition in powder form was mixed with use of a Henschel mixer, and was then melted and kneaded by a twin screw kneading extruder. This produced a polyethylene resin composition.

Next, the polyethylene resin composition was rolled with use of a pair of rollers each having a surface temperature of 150° C., so that a sheet was prepared. This sheet was immersed in an aqueous hydrochloric acid solution (containing 4 mol/L of hydrochloric acid and 0.5% by weight of nonionic surfactant) for dissolving and removal of the calcium carbonate. Subsequently, the sheet was stretched at a stretching temperature of 105° C. and a stretching magnification of 6 times, and thus a porous film (layer A) made of polyethylene was prepared.

<Layer B>

(Preparation of Coating Liquid 1 (Dispersion Liquid of Rf Resin))

Under a room temperature, 154.15 g of resorcin and 340.89 g of a 37% aqueous formaldehyde solution were put into a 2-L separable flask in which air had been replaced with nitrogen so that a molar ratio of resorcin and formaldehyde became 1:3. Further, 1541.5 g of water and 0.0786 g of sodium carbonate were added. A dispersion state was made uniform by stirring and then a temperature was raised to 80° C. The mixture was kept at 80° C. for 24 hours to carry out polymerization reaction, and thus a suspension containing particles of a resorcin-formalin resin (RF resin) was obtained.

After radiational cooling, the suspension thus obtained was centrifuged, so that the particles of the RF resin precipitated. Then, a supernatant dispersion medium was removed while the precipitated particles of the RF resin were left. Then, the RF resin was cleaned by carrying out twice a cleaning operation including (i) adding water which served as a cleaning liquid, (ii) stirring a resulting mixture, and (iii) centrifuging the mixture so as to remove the cleaning liquid. That is, the cleaning operation was carried out twice in total. Particles of the cleaned RF resin were dried, and an organic filler (1) (D50: 1.0 μm) was quantitatively synthesized. As a binder resin, sodium carboxymethylcellulose (CMC) (available from DAICEL CORPORATION; CMC1110) was used.

As a solvent, a mixed solvent containing water and isopropyl alcohol (water:isopropyl alcohol=95% by weight: 5% by weight) was used.

The organic filler (1), CMC, and the solvent were mixed so that a solid concentration, that is, a total concentration of the organic filler (1) and CMC became 20.0% by weight and a weight ratio of organic filler (1):CMC became 100:3, and thus a coating liquid 1 was prepared.

<Nonaqueous Electrolyte Secondary Battery Laminated Separator>

Before coating, the coating liquid 1 was left still for 1 hour at a room temperature, so that a dispersion state of components in the coating liquid 1 became moderately nonuniform. One surface of the layer A was coated, by use of a gravure coater, with the coating liquid 1 which had been left still for 1 hour, and then dried to deposit the binder resin, i.e., CMC contained in the coating liquid 1. Thus, a laminated porous film 1 in which the layer B was stacked on the surface of the layer A was obtained. The laminated porous film 1 thus obtained is herein referred to as a nonaqueous electrolyte secondary battery laminated separator 1.

Example 2

A nonaqueous electrolyte secondary battery laminated separator 2 was prepared with use of a layer A and a layer B below.

<Layer A>

A polyethylene porous film (layer A) was prepared by carrying out an operation similar to that of Example 1.

<Layer B>

(Preparation of Coating Liquid 2 (Aramid Coating Liquid))

With use of a 3-liter separable flask having a stirring blade, a thermometer, a nitrogen in current canal, and a powder addition port, poly(paraphenylene terephthalamide) was produced.

The flask was sufficiently dried, 2200 g of N-methyl-2-pyrrolidone (hereinafter, referred to as "NMP") was put in the flask, and 151.07 g of calcium chloride powder that had been vacuum-dried at 200° C. for 2 hours was added to the NMP and then completely dissolved in the NMP while a temperature of a mixture of the NMP and the calcium chloride powder was raised to 100° C.

The temperature of a resultant solution was brought down to a room temperature, and then 68.23 g of paraphenylenediamine (hereinafter, referred to as "PPD") was added to and completely dissolved in a resultant mixture. While a temperature of a resultant solution was maintained at 20° C.±2° C. and a dissolved oxygen concentration in polymerization was maintained at 0.5%, 124.97 g of dichloride terephthalate (hereinafter, referred to as "TPC"), which was separated into 10 pieces, was one-by-one added to the solution at approximately 5-minute intervals. After that, a resultant solution was ripened for 1 hour while being stirred and maintained at 20° C.±2° C. Then, the solution thus ripened was filtered through 1500-mesh stainless steel gauze. The solution thus obtained was a para-aramid solution having a para-aramid concentration of 6%.

The para-aramid solution thus obtained was weighed by 100 g and put in a flask. Then, 300 g of NMP was added to the solution. Thus, a para-aramid solution having a para-aramid concentration of 1.5% by weight was prepared, and the solution thus prepared was stirred for 60 minutes.

Subsequently, 3 g of fine powdery alumina (available from NIPPON AEROSIL CO., LTD., alumina C (ALC), D50: 0.013 µm) was mixed with the solution, and a resultant solution was stirred for 240 minutes. A resultant solution was filtered with a 1000-mesh metal gauze, and then 0.73 g of calcium carbonate was added and stirred for 240 minutes for neutralization. A resultant mixture was then defoamed under reduced pressure, and thus a coating liquid in the form of slurry was prepared. The coating liquid thus prepared is herein referred to as a coating liquid 2.

<Nonaqueous Electrolyte Secondary Battery Laminated Separator>

The coating liquid 2 was left still for 1 hour at a room temperature, so that a dispersion state of components in the coating liquid 2 became moderately nonuniform. After the coating liquid 2 had been left still for 1 hour, a layer A having a thickness of 10 µm was coated with the coating liquid 2, and thus a coating film was formed. Subsequently, the coating film was dried under an atmosphere at 50° C. and at a relative humidity of 70%, and thus an aromatic polymer, i.e., the para-aramid contained in the coating liquid 2 was deposited on the layer A. Next, the coating film from which the aromatic polymer had been deposited was cleaned with water and dried, and thus a laminated porous film 2 in which a porous layer was stacked on the layer A was obtained. The laminated porous film 2 thus obtained is herein referred to as a nonaqueous electrolyte secondary battery laminated separator 2.

Example 3

A nonaqueous electrolyte secondary battery laminated separator 3 was prepared with use of a layer A and a layer B below.

<Layer A>

A polyethylene porous film (layer A) was prepared by carrying out an operation similar to that of Example 1.

<Layer B>

(Preparation of Coating Liquid 3 (Aramid Coating Liquid))

A coating liquid in the form of slurry was prepared by carrying out an operation similar to that of Example 2, except that a weight of fine powdery alumina to be mixed with the "para-aramid solution having a para-aramid concentration of 1.5% by weight" was changed to 6 g. The coating liquid thus prepared is herein referred to as a coating liquid 3.

<Nonaqueous Electrolyte Secondary Battery Laminated Separator>

A laminated porous film 3 in which a porous layer was stacked on a layer A was obtained by carrying out an operation similar to that of Example 2, except that the coating liquid 3 was used instead of the coating liquid 2. The laminated porous film 3 thus obtained is herein referred to as a nonaqueous electrolyte secondary battery laminated separator 3.

Example 4

A nonaqueous electrolyte secondary battery laminated separator 4 was prepared with use of a layer A and a layer B below.

<Layer A>

A polyethylene porous film (layer A) was prepared by carrying out an operation similar to that of Example 1.

<Layer B>

(Preparation of Coating Liquid 4 (Aramid Coating Liquid))

A coating liquid in the form of slurry was prepared by carrying out an operation similar to that of Example 2, except that a weight of fine powdery alumina to be mixed with the "para-aramid solution having a para-aramid concentration of 1.5% by weight" was changed to 2 g. The coating liquid thus prepared is herein referred to as a coating liquid 4.

<Nonaqueous Electrolyte Secondary Battery Laminated Separator>

A laminated porous film 4 in which a porous layer was stacked on a layer A was obtained by carrying out an operation similar to that of Example 2, except that the coating liquid 4 was used instead of the coating liquid 2. The laminated porous film 4 thus obtained is herein referred to as a nonaqueous electrolyte secondary battery laminated separator 4.

Comparative Example 1

A nonaqueous electrolyte secondary battery laminated separator 5 was prepared with use of a layer A and a layer B below.

<Layer A>

A polyethylene porous film (layer A) was prepared by carrying out an operation similar to that of Example 1.

<Layer B>

(Preparation of Coating Liquid 5 (a Alumina Dispersion Liquid))

A coating liquid was prepared by carrying out an operation similar to that of Example 1, except that a alumina powder (available from Sumitomo Chemical Company, Limited, product name: Sumicorandom AA05, D50: 0.5 µm) was used instead of the organic filler (1). The coating liquid thus prepared is herein referred to as a coating liquid 5.

<Nonaqueous Electrolyte Secondary Battery Laminated Separator>

One surface of the layer A was subjected to a corona treatment at 20 W/(m$^2$/min). Next, the surface of the layer A which has been subjected to the corona treatment was coated with the coating liquid 5 with use of a gravure coater. After the layer A had been uniformly coated with the coating liquid 5, the coating film was dried to deposit CMC contained in the coating liquid 5, and thus a porous layer (layer B) was formed on the layer A. Thus, a laminated porous film 5 in which the layer B was stacked on one surface of the layer A was obtained. The laminated porous film 5 thus obtained is herein referred to as a nonaqueous electrolyte secondary battery laminated separator 5.

Comparative Example 2

A nonaqueous electrolyte secondary battery laminated separator 6 was prepared with use of a layer A and a layer B below.

<Layer A>

A polyethylene porous film (layer A) was prepared by carrying out an operation similar to that of Example 1.

<Layer B>

(Preparation of Coating Liquid 6 (Aramid Coating Liquid))

To 5000 g of an NMP/calcium chloride solution (calcium chloride concentration=7.1% by weight), 150.00 g of PPD was added and stirred in a nitrogen atmosphere to dissolve the PPD. Then, 273.94 g of TPC was added and stirred at 15°

C. to cause reaction for 1 hour, and thus a polymer solution of polyparaphenylene terephthalamide was obtained.

The polymer solution was taken in an amount of 1000 g and, to the solution, 3000 g of NMP, 23.4 g of calcium carbonate (available from Ube Material Industries, Ltd.), 60 g of particles (a) (fine powdery alumina (available from NIPPON AEROSIL CO., LTD., alumina C (ALC), average particle size: 0.013 μm)), and 60 g of particles (b) (alumina powder (available from Sumitomo Chemical Company, Limited, Sumicorandom AA03, average particle size: 0.3 μm)) were added. After mixing by stirring, a dispersing process was carried out once under pressure of 50 MPa with use of a Gaulin homogenizer (available from APV), and thus a coating liquid (aramid coating liquid) having a solid content concentration of 4.35% (aramid:particles (a):particles (b)=1:1:1) was prepared. The coating liquid thus prepared is herein referred to as a coating liquid 6.

A laminated porous film 6 in which a porous layer was stacked on a layer A was obtained by carrying out an operation similar to that of Example 2, except that the coating liquid 6 was used instead of the coating liquid 2. The laminated porous film 6 thus obtained is herein referred to as a nonaqueous electrolyte secondary battery laminated separator 6.

<Evaluation of Physical Properties of Nonaqueous Electrolyte Secondary Battery Laminated Separator, Layer A, and Layer B>

Physical properties and the like of the nonaqueous electrolyte secondary battery laminated separators 1 through 6 obtained in Examples 1 through 4 and Comparative Examples 1 and 2 and of the layers A and the layers B included in the nonaqueous electrolyte secondary battery laminated separators 1 through 6 were measured with the foregoing methods. Tables 1 and 2 show the results.

<Preparation of Nonaqueous Electrolyte Secondary Battery>

(Preparation of Positive Electrode)

A mixture obtained by mixing 6 parts by weight of acetylene black and 4 parts by weight of polyvinylidene fluoride (available from KUREHA CORPORATION) with 90 parts by weight of $LiNi_{1/3}Mn_{1/3}CO_{1/3}O_2$ serving as a positive electrode active material was dispersed in NMP, and thus a slurry was prepared. The slurry thus obtained was applied uniformly to a part of an aluminum foil serving as a positive electrode current collector and dried, and then rolled to have a thickness of 80 μm with a pressing machine.

Next, the aluminum foil thus rolled was cut so as to obtain a positive electrode that had (i) a first portion on which a positive electrode active material layer was formed and which had a size of 40 mm×35 mm and (ii) a second portion on which no positive electrode active material layer was formed, which had a width of 13 mm, and which remained on an outer periphery of the first portion. The positive electrode active material layer had a density of 2.50 $g/cm^3$.

(Preparation of Negative Electrode)

Graphite powder (serving as a negative electrode active material) in an amount of 98 parts by weight was mixed with 100 parts by weight of an aqueous solution containing carboxymethyl cellulose serving as a thickener and a binding agent (carboxymethyl cellulose concentration: 1% by weight) and with 1 part by weight of a water-based emulsion of styrene-butadiene rubber, and thus a slurry was prepared. The slurry thus obtained was applied to a part of a rolled copper foil, which served as a negative electrode current collector and had a thickness of 20 μm, and dried, and then rolled to have a thickness of 80 μm with a pressing machine.

Next, the rolled copper foil thus rolled was cut so as to obtain a negative electrode that had (i) a first portion on which a negative electrode active material layer was formed and which had a size of 50 mm×40 mm and (ii) a second portion on which no negative electrode active material layer was formed, which had a width of 13 mm, and which remained on an outer periphery of the first portion. The negative electrode active material layer had a density of 1.40 $g/cm^3$.

<Preparation of Nonaqueous Electrolyte Secondary Battery>

In a laminate pouch, the positive electrode, each of the nonaqueous electrolyte secondary battery laminated separators 1 through 6, and the negative electrode were stacked (arranged) in this order so that (i) the layer B of each of the nonaqueous electrolyte secondary battery laminated separators 1 through 6 and the positive electrode active material layer of the positive electrode come into contact with each other and (ii) the layer A of each of the nonaqueous electrolyte secondary battery laminated separators 1 through 6 and the negative electrode active material layer of the negative electrode come into contact with each other. This produced a nonaqueous electrolyte secondary battery member. In so doing, the positive electrode and the negative electrode were arranged so that a main surface of the positive electrode active material layer of the positive electrode was entirely included in a range of a main surface of the negative electrode active material layer of the negative electrode (i.e., entirely covered by the main surface of the negative electrode active material layer of the negative electrode).

Subsequently, the nonaqueous electrolyte secondary battery member was put into a bag made of a laminate of an aluminum layer and a heat seal layer. Further, 0.23 mL of nonaqueous electrolyte was put into the bag. The nonaqueous electrolyte was prepared by dissolving $LiPF_6$ in a mixed solvent of ethylene carbonate, ethyl methyl carbonate, and diethyl carbonate at a ratio of 3:5:2 (volume ratio) so that the $LiPF_6$ would be contained at 1 mol/L. The bag was then heat-sealed while pressure inside the bag was reduced, so that a nonaqueous electrolyte secondary battery was prepared. Nonaqueous electrolyte secondary batteries prepared with use of the respective nonaqueous electrolyte secondary battery laminated separators 1 through 6 are herein referred to as nonaqueous electrolyte secondary batteries 1 through 6.

<AC Resistance Increase Ratio (%) at 10 Hz Through Initial Charge and Discharge>

For each of the nonaqueous electrolyte secondary batteries 1 through 6 immediately after preparation, i.e., for each of the nonaqueous electrolyte secondary batteries 1 through 6 which had not been subjected to a charge-discharge cycle, an AC resistance at 10 Hz before initial charge and discharge was measured.

Then, each of the nonaqueous electrolyte secondary batteries 1 through 6 whose AC resistances at 10 Hz before initial charge and discharge had been measured was subjected to four cycles of initial charge and discharge at 25° C. Each of the four cycles of initial charge and discharge was carried out (i) at a voltage ranging from 2.7 V to 4.1 V, (ii) with CC-CV charge at a charge current value of 0.1 C (where the terminal current condition was 0.02 C), and (iii) with CC discharge at a discharge current value of 0.2 C (where the value of an electric current at which a battery rated capacity defined as a one-hour rate discharge capacity was discharged in one hour was assumed to be 1 C; the same applies hereinafter). Note here that the "CC-CV charge" is a charging method in which (i) a battery is charged at a predetermined constant electric current and, (ii) after a certain voltage is reached, the certain voltage is maintained while the electric current is being reduced. The "CC discharge" is a discharging method in which a battery is discharged at a predetermined constant electric current until a certain voltage is reached. For each of the nonaqueous electrolyte secondary batteries 1 through 6 after initial charge and discharge, an AC resistance at 10 kHz after initial charge and discharge was measured by the foregoing method.

From the AC resistance at 10 Hz thus obtained, an AC resistance increase ratio at 10 Hz through initial charge and discharge was calculated based on the following formula (3). The calculated values are shown in Table 2.

AC resistance increase ratio (%) at 10 Hz through initial charge and discharge=AC resistance at 10 Hz after initial charge and discharge×100/AC resistance at 10 Hz before initial charge and discharge (3)

TABLE 1

| | Porous film | Porous layer | | | | Laminated |
|---|---|---|---|---|---|---|
| | Film thickness [μm] | Filler content [% by weight] | Binder resin content [% by weight] | Weight per unit area [g/m$^2$] | Thickness [μm] | separator Thickness [μm] |
| Example 1 | 10.0 | 97.1 | 2.9 | 2.5 | 4.1 | 14.1 |
| Example 2 | 10.3 | 33.3 | 66.7 | 1.1 | 1.7 | 12.0 |
| Example 3 | 10.3 | 50.0 | 50.0 | 2.7 | 4.1 | 14.4 |
| Example 4 | 10.3 | 25.0 | 75.0 | 1.1 | 1.4 | 11.7 |
| Com. Ex. 1 | 10.0 | 97.1 | 2.9 | 7.0 | 4.7 | 14.7 |
| Com. Ex. 2 | 10.5 | 66.7 | 33.3 | 4.7 | 6.3 | 16.8 |

TABLE 2

| | Porous layer Standard deviation of Bursting strength | Nonaqueous electrolyte secondary battery AC resistance increase ratio [%] at 10 kHz through initial charge and discharge |
|---|---|---|
| Example 1 | 1.6 | 110.5 |
| Example 2 | 1.2 | 116.7 |
| Example 3 | 2.9 | 99.2 |
| Example 4 | 4.1 | 124.4 |
| Com. Ex. 1 | 0.5 | 147.1 |
| Com. Ex. 2 | 11.6 | 137.6 |

As shown in Table 2, the nonaqueous electrolyte secondary batteries 1 through 4 produced in Examples 1 through 4 have AC resistance increase ratios (%) at 10 Hz through initial charge and discharge which are lower than those of the nonaqueous electrolyte secondary batteries 5 and 6 produced in Comparative Examples 1 and 2. It has been thus confirmed that the nonaqueous electrolyte secondary batteries 1 through 4 have improved initial battery characteristics.

The nonaqueous electrolyte secondary batteries 1 through 4 include the porous layers in which standard deviations of bursting strength are 0.6 or more and 11.0 or less. The fact that the standard deviation of bursting strength falls within the above range means that the porous layer includes a certain ratio of portions which are more likely to stretch with respect to stresses applied from all directions. That is, the fact that the standard deviation of bursting strength falls within the above range indicates that a certain range of nonuniformity exists in elasticity of the porous layer and of the nonaqueous electrolyte secondary battery laminated separator including the porous layer.

From this, the nonaqueous electrolyte secondary battery porous layer and the nonaqueous electrolyte secondary battery laminated separator in accordance with an embodiment of the present invention have moderate unevenness (nonuniformity) in elasticity with respect to stresses form all directions, and can thus suitably follow local expansion of the electrode caused due to the gas locally generated in initial charge and discharge of the nonaqueous electrolyte secondary battery. As a result, the nonaqueous electrolyte secondary battery porous layer and the nonaqueous electrolyte secondary battery laminated separator in accordance with an embodiment of the present invention can suitably reduce local expansion of the battery that is caused due to local expansion of the electrode caused in initial charge and discharge of the nonaqueous electrolyte secondary battery, and can improve the initial battery characteristic of the nonaqueous electrolyte secondary battery.

INDUSTRIAL APPLICABILITY

A nonaqueous electrolyte secondary battery porous layer in accordance with an embodiment of the present invention is usable for production of a nonaqueous electrolyte secondary battery having an excellent initial battery characteristic.

The invention claimed is:

1. A nonaqueous electrolyte secondary battery porous layer, wherein a standard deviation of bursting strength is 0.6 or more and 11.0 or less, the nonaqueous electrolyte secondary battery porous layer contains a resin and a filler, and the thickness of the nonaqueous electrolyte secondary battery porous layer is 5 μm or less.

2. The nonaqueous electrolyte secondary battery porous layer as set forth in claim 1, wherein the resin contains one or more resins selected from the group consisting of polyolefin, a (meth)acrylate resin, a fluorine-containing resin, a nitrogen-containing aromatic resin, a polyester resin, and a water-soluble polymer.

3. The nonaqueous electrolyte secondary battery porous layer as set forth in claim 1, wherein the resin comprises a nitrogen-containing aromatic resin.

4. The nonaqueous electrolyte secondary battery porous layer as set forth in claim 2, wherein the nitrogen-containing aromatic resin includes a polyamide resin.

5. The nonaqueous electrolyte secondary battery porous layer as set forth in claim 4, wherein the polyamide resin is an aramid resin.

6. The nonaqueous electrolyte secondary battery porous layer as set forth in claim 5, wherein the aramid resin is one or more aramid resins selected from the group consisting of poly(paraphenylene terephthalamide), poly(metaphenylene terephthalamide), and a paraphenylene terephthalamide/metaphenylene terephthalamide copolymer.

7. The nonaqueous electrolyte secondary battery porous layer as set forth in claim 1, wherein the filler is a heat-resistant filler.

8. The nonaqueous electrolyte secondary battery porous layer as set forth in claim 7, wherein the heat-resistant filler is an inorganic filler.

9. The nonaqueous electrolyte secondary battery porous layer as set forth in claim 8, wherein the inorganic filler contains one or more inorganic substances selected from the group consisting of alumina, boehmite, aluminum hydroxide, magnesium hydroxide, magnesium oxide, titanium oxide, and silica.

10. A nonaqueous electrolyte secondary battery laminated separator, wherein a nonaqueous electrolyte secondary battery porous layer recited in claim 1 is stacked on one surface or both surfaces of a polyolefin porous film.

11. A nonaqueous electrolyte secondary battery comprising:
 a nonaqueous electrolyte secondary battery porous layer recited in claim 1.

12. A nonaqueous electrolyte secondary battery comprising:
 a nonaqueous electrolyte secondary battery laminated separator recited in claim 10.

\* \* \* \* \*